(12) United States Patent
Takahashi et al.

(10) Patent No.: US 9,283,830 B2
(45) Date of Patent: Mar. 15, 2016

(54) WINDSHIELD DEVICE FOR VEHICLE

(71) Applicant: SUZUKI MOTOR CORPORATION, Hamamatsu-shi, Shizuoka (JP)

(72) Inventors: Akihiko Takahashi, Hamamatsu (JP); Yuki Shimizu, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 232 days.

(21) Appl. No.: 14/047,141

(22) Filed: Oct. 7, 2013

(65) Prior Publication Data

US 2014/0159426 A1    Jun. 12, 2014

(30) Foreign Application Priority Data

Dec. 12, 2012 (JP) .................................. 2012-271635
Dec. 12, 2012 (JP) .................................. 2012-271701

(51) Int. Cl.
*B60J 1/02* (2006.01)
*B60J 1/04* (2006.01)
*B62D 25/08* (2006.01)
*B62J 17/04* (2006.01)

(52) U.S. Cl.
CPC ................ *B60J 1/04* (2013.01); *B62D 25/081* (2013.01); *B62J 17/04* (2013.01); *B62K 2202/00* (2013.01)

(58) Field of Classification Search
CPC ............ B60J 1/02; B60J 1/04; B62D 25/081; B62J 17/04; B62K 2202/00
USPC ............... 296/77.1, 78.1, 84.1, 89, 91, 180.1; 280/304.3
See application file for complete search history.

(56) References Cited

U.S. PATENT DOCUMENTS

2008/0236922 A1   10/2008  Tsuda
2012/0104787 A1*  5/2012   Tsukui et al. ................ 296/78.1

FOREIGN PATENT DOCUMENTS

EP    1975051 A1     10/2008
JP    S62-138685 U    9/1987
JP    2002-284073 A  10/2002

OTHER PUBLICATIONS

European Search Report, dated Nov. 28, 2013, which issued during the prosecution of European Patent Application No. 13182381.7, which corresponds to the present application.

\* cited by examiner

*Primary Examiner* — Stephen Gordon
(74) *Attorney, Agent, or Firm* — Troutman Sanders LLP

(57) ABSTRACT

A vehicle body cover formed by a front cowling covering, from a front direction, a front-head part of a vehicle body, meter panels, and a front panel, which are mutually coupled, covers the front part of the vehicle body. A windscreen capable of being vertically moved by a varying mechanism is disposed at a position above the front cowling. A traveling air taken in at a front part of the vehicle body cover via an air introduction part is exhausted from air-exhaust parts at proper places on the meter panel or the front panel, and an overlap area between the windscreen and the air introduction part in front elevational view of the vehicle changes in accordance with an aspect of the windscreen.

10 Claims, 12 Drawing Sheets

WINDSHIELD DEVICE FOR VEHICLE

CROSS-REFERENCE TO RELATED APPLICATIONS

This application is based upon and claims the benefit of priority of the prior Japanese Patent Application No. 2012-271635, filed on Dec. 12, 2012, and the prior Japanese Patent Application No. 2012-271701, filed on Dec. 12, 2012, the entire contents of which are incorporated herein by reference.

BACKGROUND OF THE INVENTION

1. Field of the Invention

The present invention relates to a windshield device, in a vehicle such as a motorcycle, formed by including a windscreen attached to a front part of a vehicle body and having a windshield function.

2. Description of the Related Art

There is a vehicle such as a motorcycle that includes a front cowling, a leg shield, a windscreen, a meter panel and the like provided at a front part of a vehicle body, in which the windscreen is designed to be vertically movable for improving a windshield effect. In a relatively large-sized vehicle which can travel at high speed, for example, if the windshield effect is tried to be increased when the vehicle travels at high speed, a negative pressure region is generated in the vicinity of a front of a driver or a passenger, and due to the negative pressure, the passenger sometimes feels that he/she is pulled toward the front direction.

In order to secure the comfortability and the like of the passenger, a measure regarding windshield is taken as in a motorcycle disclosed in Patent Document 1, for example. In this example, in order to alleviate an influence (noise, feeling of discomfort and the like) due to a negative pressure generated, during traveling, at a rear of a part from a windscreen to a leg shield, namely, a part right in front of a passenger, an air introduction port is provided at a front part of a vehicle body. Further, it is structured such that a traveling air from the front direction is taken in to be led toward a rear of the windscreen, to thereby alleviate the negative pressure.

Further, there is a motorcycle as disclosed in Patent Document 1 which includes an opening in a form of gap between a windscreen and a front cowling positioned below the windscreen. A traveling air from a front direction of a vehicle body passing through the opening hits against a cover member positioned behind the windscreen, and flows in a diagonally upward direction so as to be along a rear surface of the windscreen. Accordingly, it is possible to alleviate a negative pressure generated at a rear of the windscreen during traveling at high speed.

[Patent Document 1] Japanese Laid-open Patent Publication No. 2002-284073

However, in a case of the windshield structure as described above, the traveling air is constantly exhausted toward the rear of the windscreen even at the time of traveling at low speed in which the influence of negative pressure is small, and the passenger receives the traveling air all the time, which, if anything, results in that the structure is inferior in comfortability.

Further, almost all of the traveling air from a part below the windscreen flows toward the rear surface of the windscreen, and in order to lead the traveling air toward another place such as a rear of a front panel and a rear of a leg shield where the negative pressure is easily generated, there is a need to additionally provide an air introduction port on the front cowling.

SUMMARY OF THE INVENTION

The present invention is made in view of such circumstances, and an object thereof is to provide a windshield device for a vehicle which exhibits a proper windshield performance in a constantly effective and efficient manner.

A windshield device for a vehicle of the present invention is a windshield device for a vehicle characterized in that it includes: a vehicle body cover formed by a front cowling covering, from a front direction, a front-head part of a vehicle body, meter panels positioned at a rear of the front cowling, and a front panel positioned behind and below the meter panels, which are mutually coupled, the vehicle body cover covering the front part of the vehicle body to form a uniform external appearance of the front part of the vehicle body; and a windscreen disposed at a position above the front cowling and capable of being vertically moved by a varying mechanism, in which a traveling air taken in at a front part of the vehicle body cover via an air introduction part is exhausted from air-exhaust parts at proper places on the meter panel or the front panel, and an overlap area between the windscreen and the air introduction part in front elevational view of the vehicle changes in accordance with an aspect of the windscreen.

Further, it is characterized in that in the windshield device for the vehicle of the present invention, the varying mechanism can change the aspect of the windscreen including at least a position, an angle and a shape, and the windscreen covers a larger area of the air introduction part at its lower end position, compared to a case in which the windscreen is positioned at its rising end position, in front elevational view of the vehicle.

Further, it is characterized in that in the windshield device for the vehicle of the present invention, the windscreen covers, at its lower end position, an entire area of the air introduction part in front elevational view of the vehicle.

Further, it is characterized in that in the windshield device for the vehicle of the present invention, the windscreen includes an approximately transparent screen main body and a non-transparent cover covering a lower part of the screen main body, in which the cover covers an approximately entire area of the air introduction part at the lower end position of the windscreen, in front elevational view of the vehicle.

Further, it is characterized in that in the windshield device for the vehicle of the present invention, a screen backside ventilation passage is provided at a backside of the windscreen, and the air introduction part is positioned at a front surface of the meter panel and is communicated with an intermediate portion of the screen backside ventilation passage, in which a cross-sectional area of the screen backside ventilation passage is reduced as the windscreen moves upward.

Further, it is characterized in that in the windshield device for the vehicle of the present invention, the screen backside ventilation passage is formed rearward and upward from a lower part of the windscreen along the front surface of the meter panel, in a space between a rear surface of the windscreen and the meter panel.

Further, it is characterized in that in the windshield device for the vehicle of the present invention, the windscreen includes a projecting piece capable of blocking the screen backside ventilation passage or reducing the cross-sectional area of the screen backside ventilation passage, at a position above the air introduction part.

Further, it is characterized in that in the windshield device for the vehicle of the present invention, the projecting piece is provided at a rear surface of a cover of the windscreen.

Further, it is characterized in that in the windshield device for the vehicle of the present invention, the meter panel includes a projecting piece capable of blocking the screen backside ventilation passage or reducing the cross-sectional area of the screen backside ventilation passage, at a position above the air introduction part.

Further, it is characterized in that in the windshield device for the vehicle of the present invention, the projecting piece is formed of a flexible member.

DETAILED DESCRIPTION OF THE PREFERRED EMBODIMENTS

Hereinafter, preferred embodiments of a windshield device for a vehicle according to the present invention will be described based on the drawings.

Figure 1:
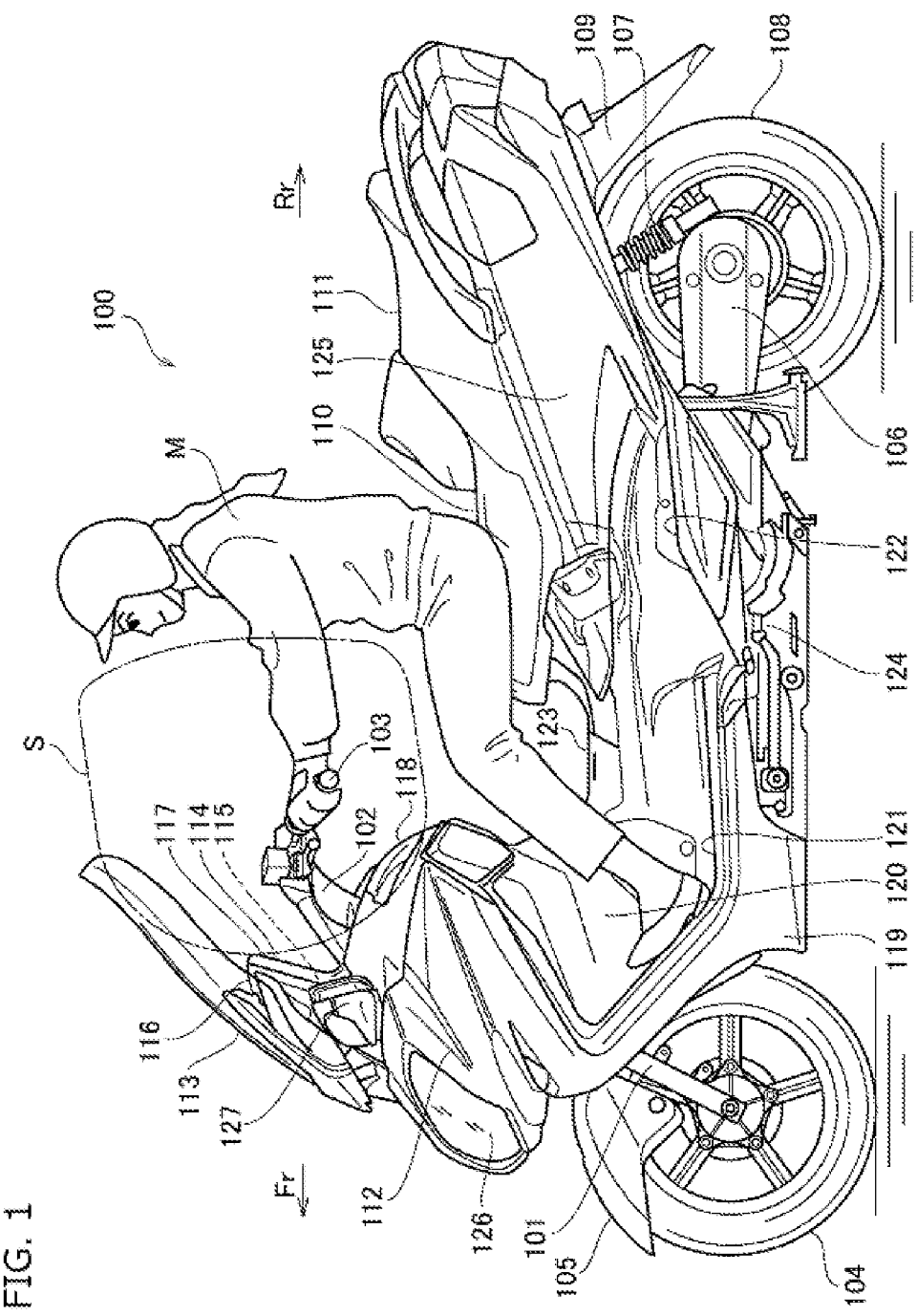
FIG. 1 is a side view of a motorcycle according to an embodiment of the present invention.
Figure 2:
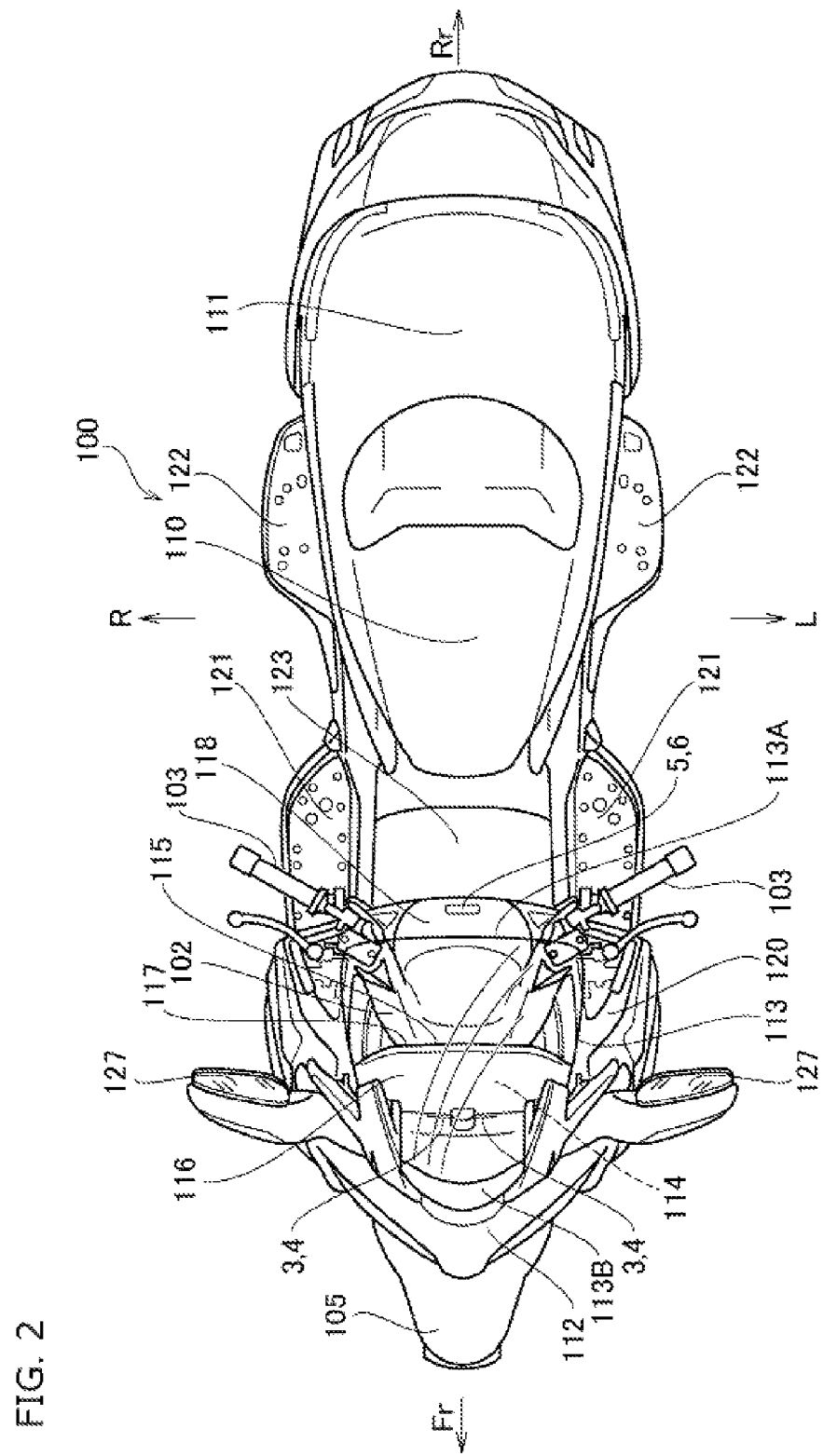
FIG. 2 is a top view of the motorcycle according to the embodiment of the present invention.
Figure 3:
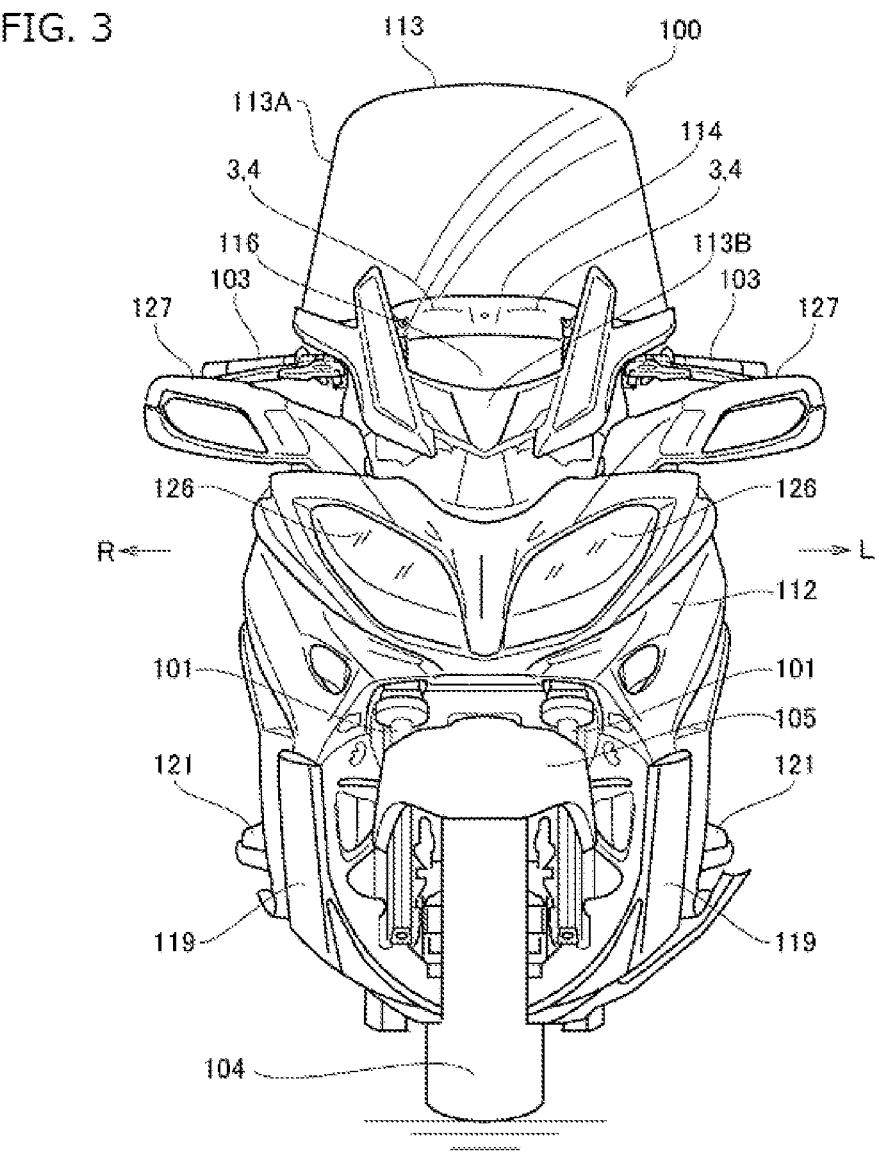
FIG. 3 is a front elevational view of the motorcycle according to the embodiment of the present invention.

The present invention can be effectively applied to respective types of motorcycles, but, in this embodiment, an example of so-called scooter type vehicle as a motorcycle 100 as illustrated in FIG. 1 and the like, for example, is employed. Here, an entire configuration of the motorcycle 100 according to the present embodiment will be first described. Note that FIG. 1 is a side view, FIG. 2 is a top view, and FIG. 3 is a front or front elevational view of the motorcycle 100. In substantial parts of these respective drawings, a front and a rear of a vehicle are indicated by an arrow mark Fr and an arrow mark Rr, respectively, and a right and a left of the vehicle are indicated by an arrow mark R and an arrow mark L, respectively.

In FIG. 1 to FIG. 3, in a front part of a later-described vehicle body frame made of steel or aluminum alloy, there are provided two front forks 101 supported to be able to pivot in right and left directions by a steering head pipe. A handle 102 is fixed to upper ends of the front forks 101, and the handle 102 has grips 103 on both right and left ends thereof. A front wheel 104 is rotatably supported by lower portions of the front forks 101, and a front fender 105 is fixed so as to cover a part above the front wheel 104.

To rear portions of the vehicle body frame, swing arms 106 are provided in a swingable manner, and a rear shock absorber 107 is laid between the vehicle body frame and the swing arms 106. The swing arms 106 have a power transmission mechanism built therein formed of a belt-type continuously variable transmission or a plurality of gear trains. A rear wheel 108 is rotatably supported on rear end portions of the swing arms 106, and the rear wheel 108 is designed to be rotationally driven via the above-described power transmission mechanism. A rear fender 109 is fixed so as to cover a part above the rear wheel 108.

Note that although not illustrated, to an engine unit mounted on the vehicle body frame, an air-fuel mixture is supplied from an intake system including an air cleaner device and the like, and an exhaust gas after combustion is exhausted through an exhaust pipe. Further, main composing members of the vehicle including not only the engine unit but also a fuel tank, a radiator device and the like are covered by a later-described vehicle body cover, resulting in that an external appearance of the vehicle exhibits a smoothly continued simple form with a sense of uniformity, as illustrated in FIG. 1. Further, a driver's seat 110 and a tandem seat 111 are continuously provided at a position of approximately center of the vehicle toward the rear direction.

Regarding the vehicle body cover at the front part of the vehicle of the motorcycle 100, a front-head part of the vehicle body is covered, from the front direction, by a front cowling 112, and at a position above the front cowling 112, a movable windscreen 113 is disposed, as will be described later. Further, at a position above the front cowling 112, there is provided a meter 114 positioned behind the windscreen 113. This meter 114 has a meter main body part 115 built therein formed by unitizing measuring instruments including a speedometer, a tachometer, various indicator lamps or the like, and a part surrounding the meter 114 and a periphery of the part are covered, from the front side, by a front meter panel 116 positioned right behind the windscreen 113. Further, the part surrounding the meter 114 and the periphery of the part are covered, from the rear side, by a rear meter panel 117 positioned so as to face a passenger M. Further, a front panel 118 is disposed at a position behind the front cowling 112 and behind and below the meter 114, and the front panel 118 is positioned so as to face the passenger M.

At a position below the front cowling 112 and the front panel 118, a front leg shield 119 and a rear leg shield 120 are mutually coupled so as to be positioned in front of legs of the passenger M. The front cowling 112, the front meter panel 116 and the rear meter panel 117 positioned behind the front cowling 112, the front panel 118, the front leg shield 119 and the rear leg shield 120 cover the front part of the vehicle body, as the vehicle body cover formed by being mutually coupled, to thereby form a uniform external appearance of the front part of the vehicle body. The above-described vehicle body cover and windscreen 113 are disposed and configured so as to cover, from the front in a vehicle traveling direction, at least the legs of a lower body and a part in the periphery of the handle 102 including an upper body of the passenger M.

On both right and left sides in the vicinity of a lower part of the rear leg shield 120, low-floor right and left footrests 121 are provided toward the rear direction, and the passenger M can be seated on the seat 110 by putting his/her feet on these footrests 121. Note that at a position behind the footrests 121, there are provided footrests 122 for the tandem seat 111. At a position between the right and left footrests 121, there is provided a center cover 123 extending in the front and rear directions while projecting upward, and having a floor tunnel part formed in the inside thereof. In a side surface of the vehicle, a part in the periphery of a lower part of the center cover 123 and a part in the periphery of a rear part of the center cover 123 are covered by a lower side cover 124 and a rear side cover 125, respectively. The lower side cover 124 and the rear side cover 125 configure a vehicle body cover in the periphery of the rear part of the vehicle, in which the respective vehicle body covers including the aforementioned vehicle body cover in the periphery of the front part of the vehicle are basically molded by a synthetic resin, and are attached and fixed to the vehicle body frame directly or indirectly via supporting members such as brackets.

Further, to a center of the front surface of the front cowling 112, a pair of right and left two-lamp-type head lamps 126 are attached, and a pair of right and left side-view mirrors 127 are supported at positions in a moderately rearward and diagonally upward direction with respect to the respective head lamps 126.

Figure 4:
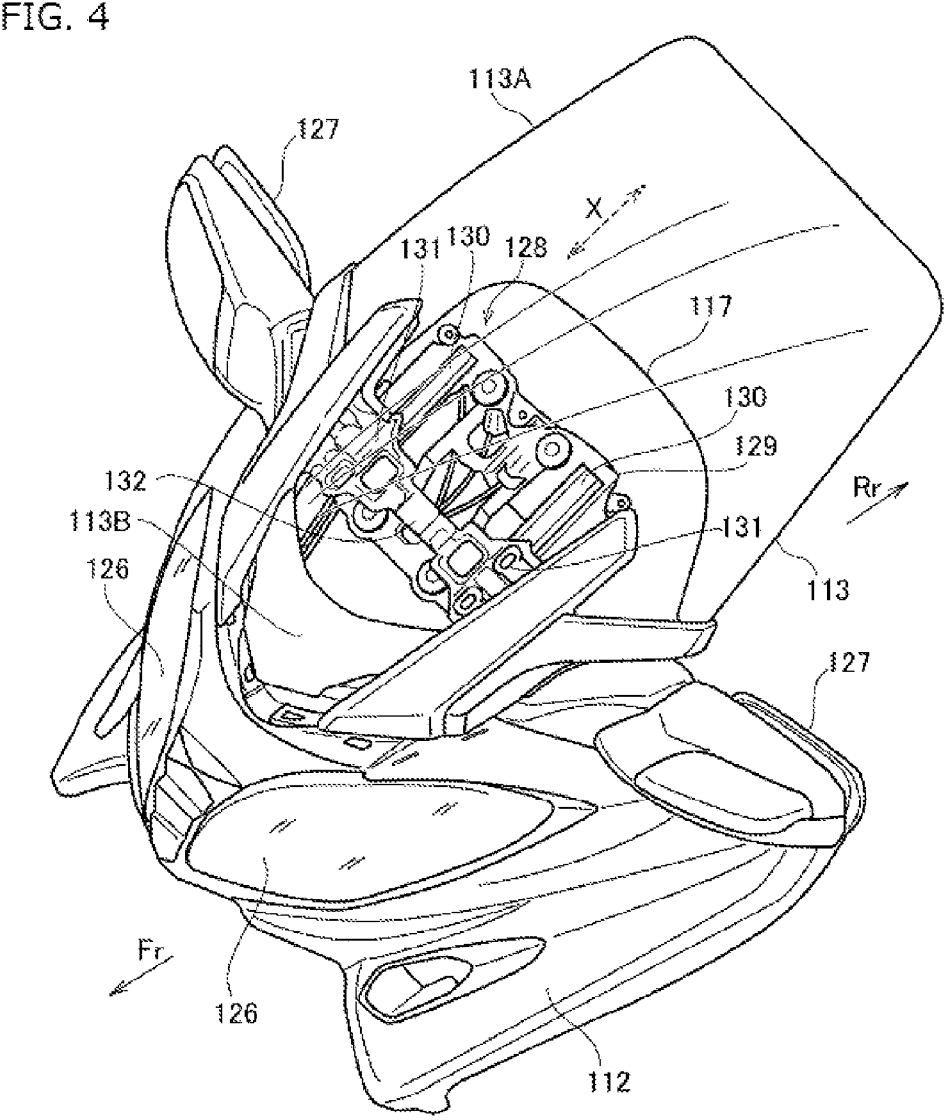
FIG. 4 is a perspective view illustrating a part in the periphery of a varying mechanism of a windscreen in the embodiment of the present invention.

As described above, the windscreen 113 is disposed at the position above the front cowling 112. Here, when a supporting structure of the windscreen 113 is schematically described, in the present embodiment, there is provided a varying mechanism that supports the windscreen 113 in a vertically movable manner. As illustrated in FIG. 4, at a rear side of the windscreen 113 (rear surface side, namely, passenger M side), a varying mechanism 128 is disposed. In this example, the mechanism is disposed by utilizing a space in the inside of the front meter panel 116 of the meter 114, and, although detailed illustration is omitted, there are provided a base plate 129 fixed to the vehicle body frame side via a bracket or the like, and a pair of right and left guide rails 130 provided by being fixed onto the base plate 129. The guide rails 130 are disposed by being inclined at a predetermined angle so that they are inclined rearward and upward along the front and rear directions. As a concrete configuration of the guide rails 130, guide rails with recessed guide grooves, for example, may be employed.

Meanwhile, there are provided sliders 131 supported so as to be disposed to correspond to the guide rails 130 via a bracket 132 fixed to the vicinity of a lower part of a rear surface of the windscreen 113. The sliders 131 engage with the guide grooves of the guide rails 130 in a slidable manner, and accordingly, the windscreen 113 can perform predetermined stroke reciprocation in up and down directions at a predetermined inclination angle along the guide rails 130 (arrow mark X in FIG. 4). Note that it is possible that an actuator including a drive motor or the like is used as a drive source for vertically moving the windscreen 113, and the actuator is operated by using a manual switch or automatically controlled in accordance with a vehicle speed or the like. In a case of the above, it is possible to design such that the windscreen 113 is positioned and fixed at, at least upper and lower stroke ends of the reciprocation of the windscreen 113, namely, it is positioned and fixed in two stages, or it is also possible to design such that the windscreen 113 is arbitrarily positioned and fixed at several places including the middle of the stroke of the reciprocation of the windscreen 113, namely, it is arbitrarily positioned and fixed in three stages or more.

Further, in this case, the windscreen 113 has: an approximately transparent screen main body 113A which is formed in an approximately trapezoid shape or the like in which a width is moderately narrowed from a lower end side with a wide width toward an upper end side; and a non-transparent cover 113B attached along a bottom edge of the screen main body 113A, as illustrated in FIG. 3 and the like. Note that the cover 113B can also be attached and fixed via the bracket 132. As illustrated in FIG. 3 and the like, the cover 113B exhibits a belt shape having a certain width in the up and down directions, and is extended along a total width of the screen main body 113A. Since the cover 113B is not transparent, it is possible to hide a member or a part positioned behind the cover 113B, in front elevational view and the like.

In the above case, in the present example, the function of vertically moving the windscreen 113 is provided as a typical function of the varying mechanism 128, and there are further provided, in addition to such a function of varying the position in the vertical direction, a function of changing an inclination angle or changing a shape, or the like, for example. As described above, the varying mechanism 128 has a varying function with which a posture and a shape of the windscreen 113 including the position of the windscreen 113 (these are comprehensively referred to as "aspect") can be arbitrarily changed.

Figure 5A:
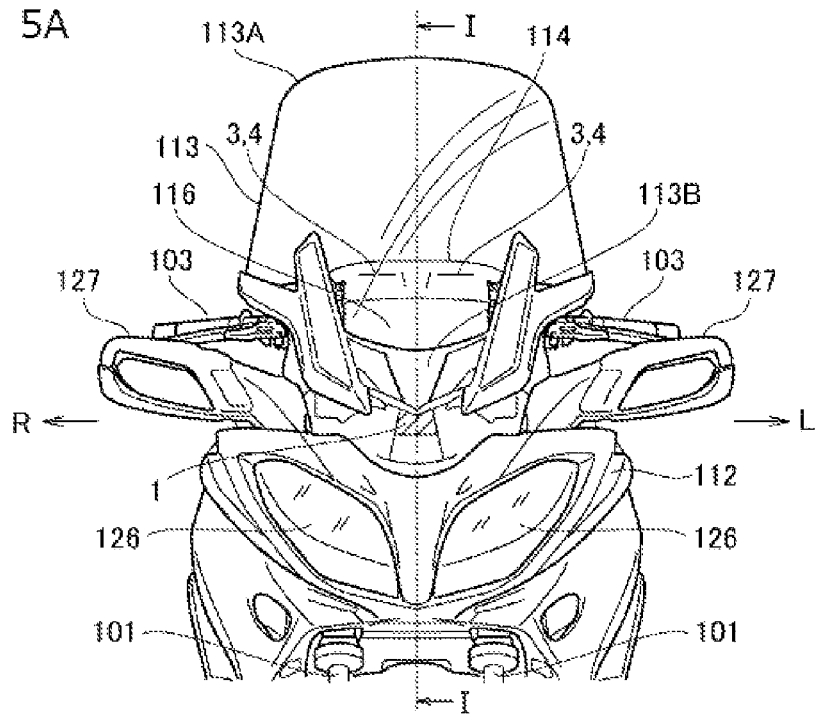
FIGS. 5A and 5B are a front elevational view and a side view, respectively, of a part in the periphery of a windshield device when the windscreen in the embodiment of the present invention is raised.
Figure 5B:
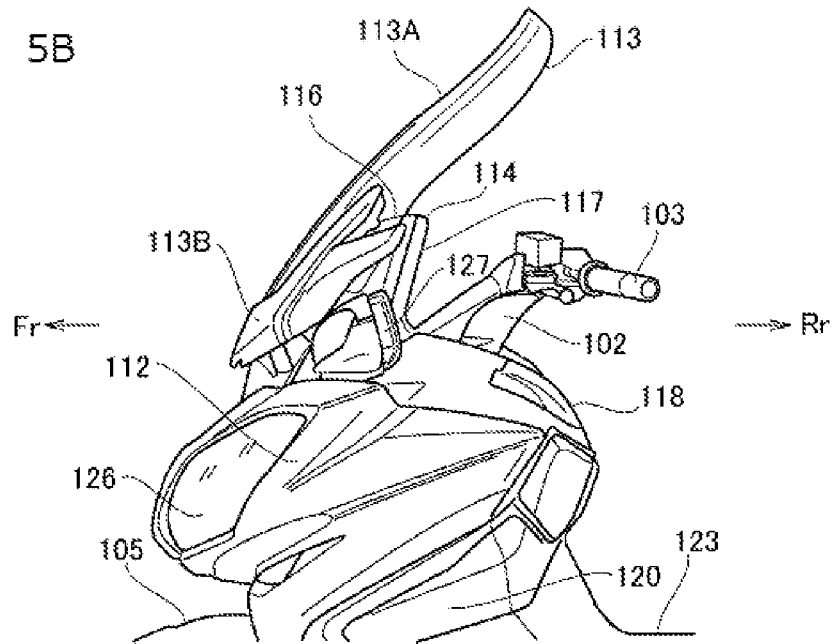
Figure 6A:
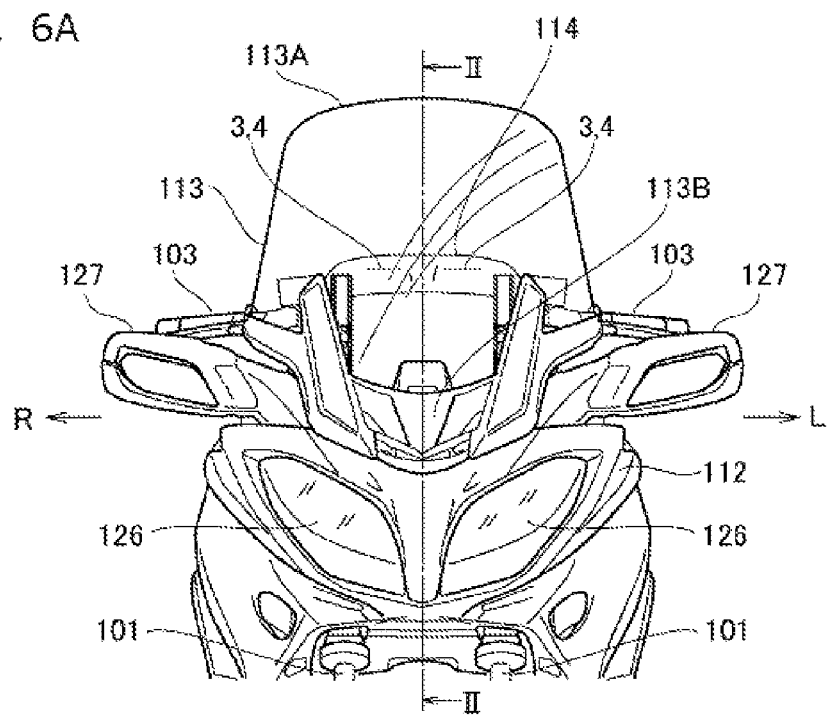
FIGS. 6A and 6B are a front elevational view and a side view, respectively, of a part in the periphery of the windshield device when the windscreen in the embodiment of the present invention is lowered.
Figure 6B:
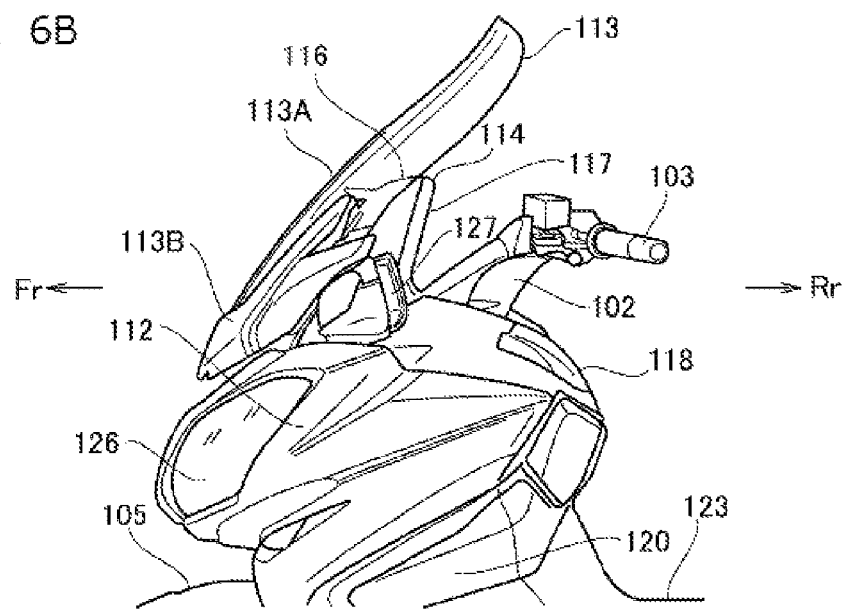

As described above, the windscreen 113 is configured in the vertically movable manner, in which it is positioned at a rising end of the vertical movement as illustrated in FIG. 5, and further, it is positioned at a lower end of the vertical movement as illustrated in FIG. 6. Note that FIG. 5A and FIG. 5B are a front elevational view and a side view, respectively, of a part in the periphery of the windscreen 113 when the windscreen 113 is at the rising end. Further, FIG. 6A and FIG. 6B are a front elevational view and a side view, respectively, of a part in the periphery of the windscreen 113 when the windscreen 113 is at the lower end.

Figure 7:
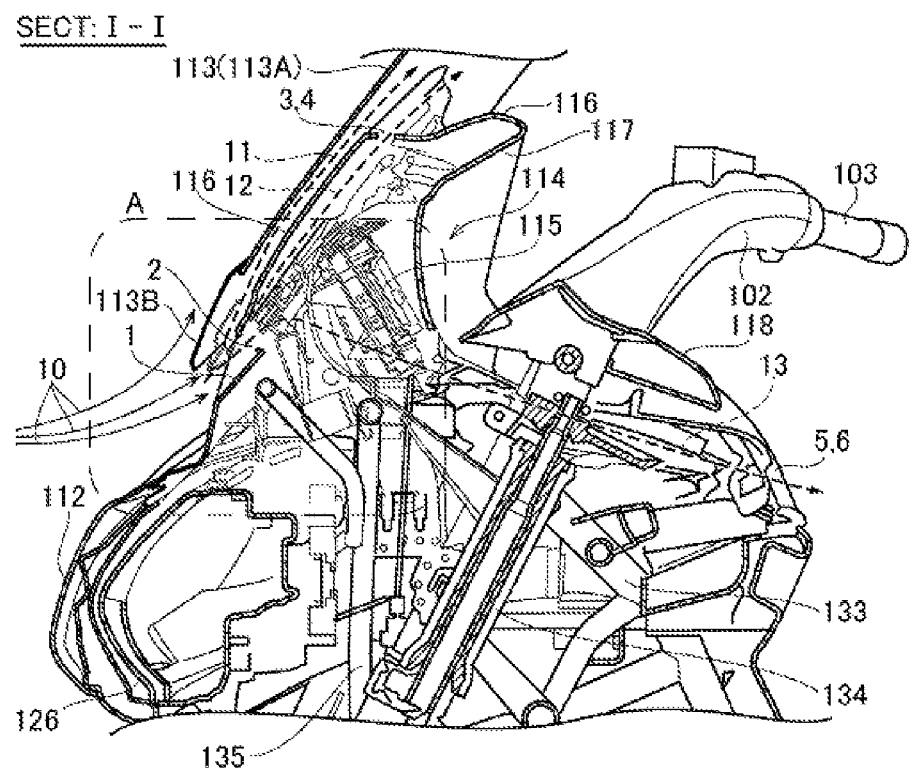
FIG. 7 shows a sectional view taken along line I-I in FIG. 5A and an enlarged view of a part A.
Figure 7:
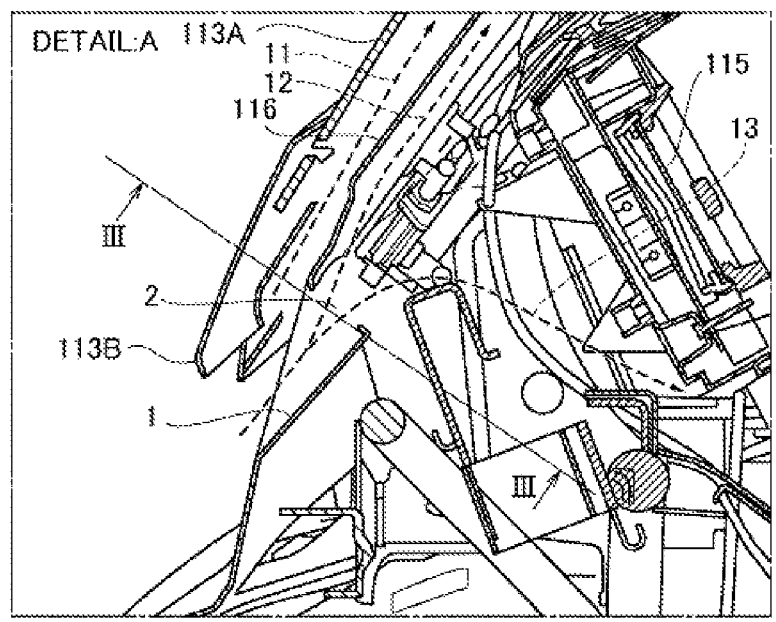
Figure 8:
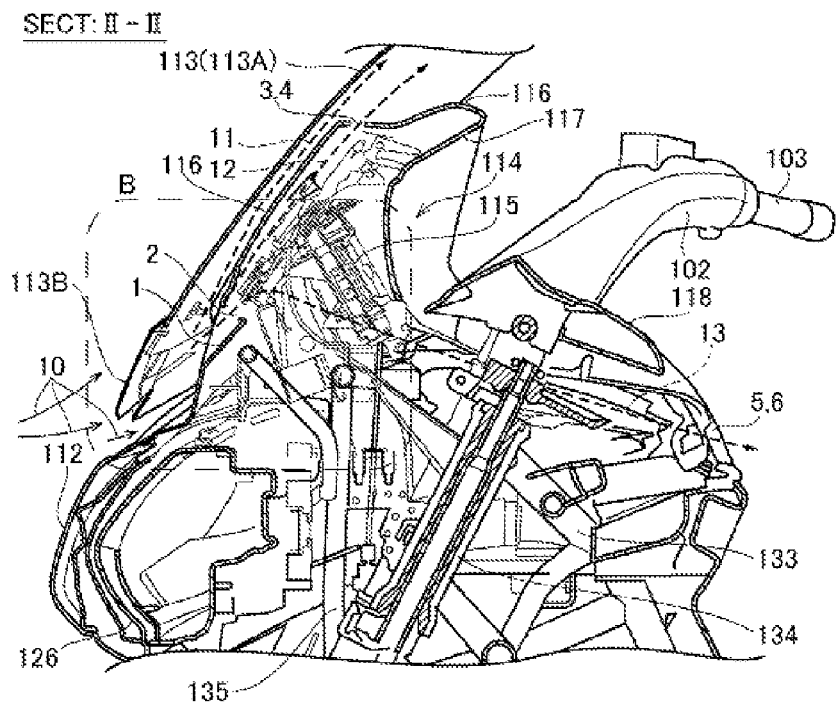
FIG. 8 shows a sectional view taken along line II-II in FIG. 6A and an enlarged view of a part B.
Figure 8:
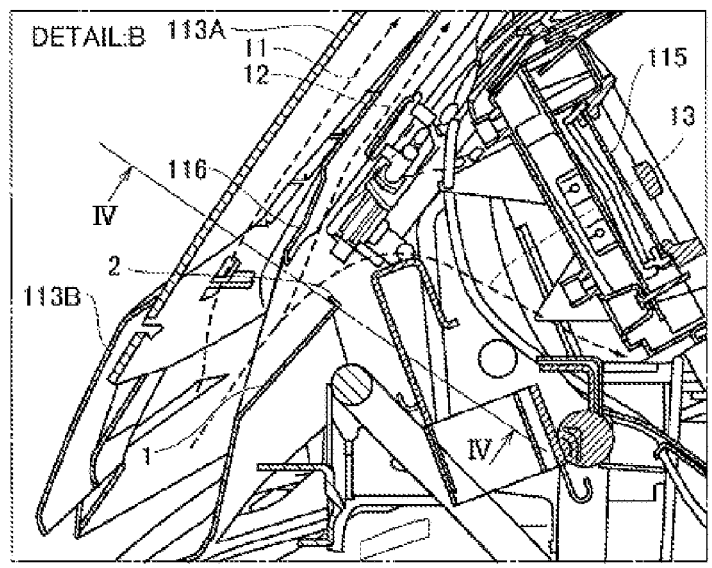

Next, FIG. 7 and FIG. 8 illustrate an internal structure of the vehicle body cover at the front part of the vehicle. Note that FIG. 7 illustrates a state where the windscreen 113 is raised, and FIG. 8 illustrates a state where the windscreen 113 is lowered. First, in these drawings, to a front and top part of the vehicle body frame 133 whose one part is illustrated, a steering head pipe 134 is coupled, and the front forks 101 are supported via this steering head pipe 134, as described above. The meter 114, the head lamps 126 and the like are attached and fixed directly or indirectly via a supporting structure formed of an appropriate bracket or stay or a supporting member 135, by utilizing the vehicle body frame 133 and the steering head pipe 134.

Now, first, in the embodiment of the present invention, there is provided a gap between the windscreen 113 and the front meter panel 116 as illustrated in FIG. 7 and the like, and by the gap, a ventilation passage 11 (screen backside ventilation passage) is formed from the lower direction to the upper direction along the backside (rear side) of the windscreen 113, as indicated by an arrow mark. Further, as indicated by oblique lines in FIG. 5A and the like in this example, on a center part in the horizontal direction of the front meter panel 116, there is provided an air introduction part 1 formed of the front meter panel 116 which is recessed rearward, and it is designed such that a traveling air 10 is taken in the inside of the vehicle body cover from the air introduction part 1. The air introduction part 1 has an air introduction port 2 at a recessed portion of the air introduction part 1 which is provided by being recessed, as illustrated in FIG. 7 or FIG. 8. The air introduction port 2 is positioned at the front part of the vehicle body cover, and is substantially opened in the approximately forward direction, thereby making the inside and the outside of the vehicle body cover to be communicated with each other.

The windscreen 113 is vertically moved at the front side of the front meter panel 116, and the periphery of the lower end part of the windscreen 113, namely, the cover 113B is disposed so as to hang from above the air introduction part 1 to cover the part. As illustrated in FIG. 7, when the windscreen 113 is raised, the cover 113B is positioned right in front of the air introduction part 1, and the cover 113B and the air introduction part 1 come close to each other to a level in which a part (lower part) of the air introduction part 1 is exposed from the lower side of the cover 113B in front elevational view of the vehicle, as illustrated in FIG. 5A. At this time, an overlap area between the windscreen 113 and the air introduction part 1 is relatively small, and the air introduction part 1 becomes substantially in an opened state. In this case, the air introduction port 2 itself is not substantially exposed, in external appearance, in front elevational view of the vehicle.

On the other hand, as illustrated in FIG. 8, when the windscreen 113 is lowered, the cover 113B is positioned below the air introduction part 1, and as illustrated in FIG. 6A, the air introduction part 1 is not exposed from the lower side of the cover 113B in front elevational view of the vehicle. At this time, an overlap area between the windscreen 113 and the air introduction part 1 is relatively large, and the air introduction part 1 becomes substantially in a closed state in front elevational view. As described above, the overlap area between the windscreen 113 and the air introduction part 1 in front elevational view of the vehicle is increased or reduced in accordance with the vertical movement of the windscreen 113.

Further, in the vicinity of the upper end part of the front meter panel 116, there are provided air-exhaust parts 3 positioned at the rear side of the windscreen 113, as illustrated in FIG. 7 or FIG. 8. To each of the air-exhaust parts 3, an air-exhaust port 4 opening upward is formed. As illustrated in FIG. 5A, in this example, there are provided a pair of right and left air-exhaust ports 4 which are symmetric with respect to a center. There is formed an internal ventilation passage 12 in which a part of the traveling air 10 taken in the inside of the vehicle body cover from the air introduction part 1 flows toward the air-exhaust port 4 along approximately backside (rear side) of the front meter panel 116, as indicated by an arrow mark.

Further, in the vicinity of a rear part of the front panel 118, there is provided an air-exhaust part 5 as illustrated in FIG. 7 or FIG. 8. To the air-exhaust part 5, an air-exhaust port 6 opening toward the passenger M (refer to FIG. 1) side is formed. As illustrated in FIG. 2, in this example, a single air-exhaust port 6 is provided at a center part in the horizontal direction of the vehicle. There is formed an internal ventilation passage 13 in which a part of the traveling air 10 taken in the inside of the vehicle body cover from the air introduction part 1 flows toward the air-exhaust port 6 by passing through the inside of the vehicle body cover, as indicated by an arrow mark.

Figure 9:
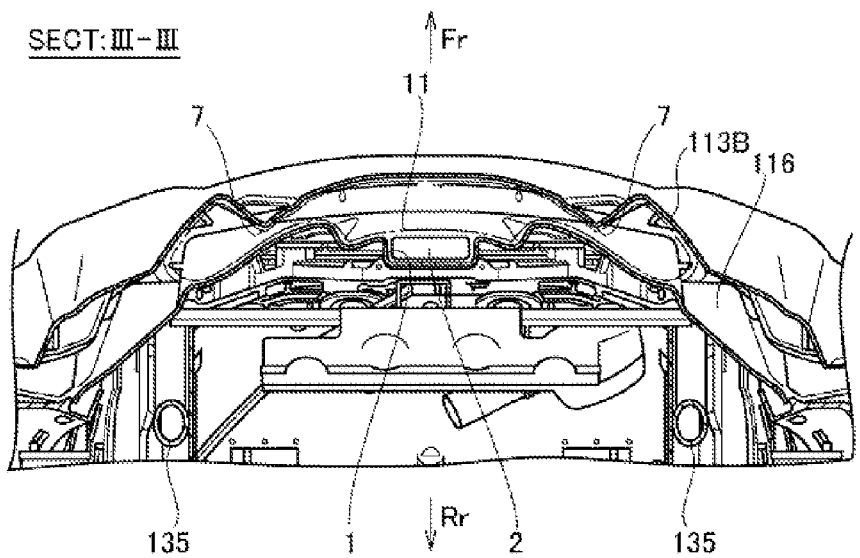
FIG. 9 is a sectional view taken along line III-III in FIG. 7, illustrating a part in the periphery of a screen backside ventilation passage when the windscreen in the embodiment of the present invention is raised.
Figure 10:
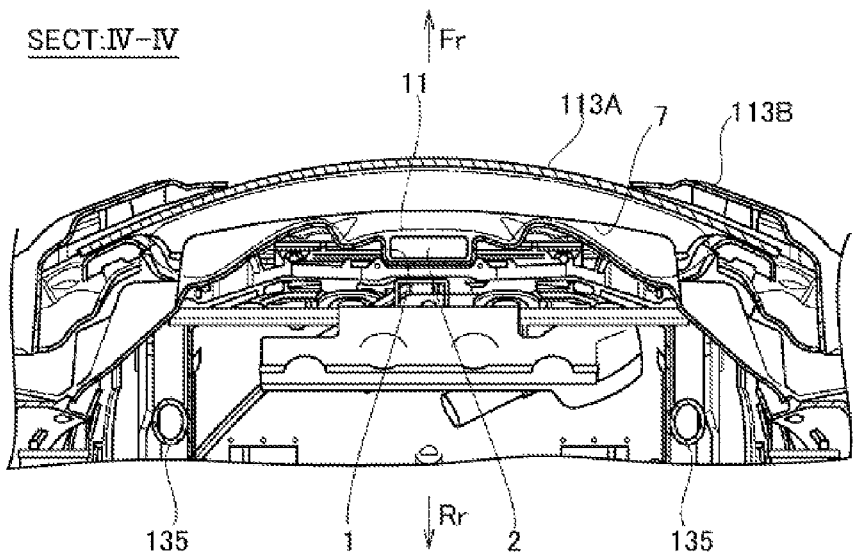
FIG. 10 is a sectional view taken along line IV-IV in FIG. 8, illustrating a part in the periphery of the screen backside ventilation passage when the windscreen in the embodiment of the present invention is lowered.

Here, when a shape of the cover 113B is described by referring to FIG. 9 (when the windscreen 113 is raised), there are provided narrowing parts 7 formed by making a part of the cover 113B to be projected toward the front meter panel 116 side. In this example, a pair of narrowing parts 7 disposed by being separated from each other in the horizontal direction are formed so as to sandwich the air introduction part 1, and by providing these narrowing parts 7, when the windscreen 113 is raised, in particular, a cross-sectional area of the screen backside ventilation passage 11 indicated by a dashed line in FIG. 9 is reduced, compared to a case where the windscreen 113 is lowered (FIG. 10). The narrowing parts 7 are formed so that a cross-sectional area projecting toward the front meter panel 116 side is gradually increased when the windscreen 113 is raised, and the cross-sectional area becomes the largest at the rising end position of the windscreen 113.

The windshield device for the vehicle of the present invention is configured as above, and next, main operation and effect and the like of the device will be described.

As illustrated in FIG. 5B or FIG. 6B, when the vehicle travels, it receives the traveling air 10 from the front direction, but, it is possible to prevent the traveling air from being directly hit against the passenger M, because of a windshield effect provided by the vehicle body cover formed of the front cowling 112, the windscreen 113 and the like. In this case, since the windscreen 113 is movable, by raising/lowering the windscreen 113 in accordance with the high speed/low speed of traveling speed of the motorcycle 100, a proper windshield effect can be achieved. Meanwhile, since the windscreen 113 is raised at a time of traveling at high speed, in particular, a negative pressure region S is generated at a rear of the windscreen 113 and the front panel 118 as illustrated in FIG. 1, which becomes, if no measure is taken, a main cause of making the passenger M uncomfortable.

In the present invention, the aspect of the windscreen 113 is changed, with the use of the varying mechanism 128, in accordance with the situation and the like of the vehicle. Concretely, the overlap area between the windscreen 113 and the air introduction part 1 in front elevational view of the vehicle is increased or decreased in accordance with the vertical movement of the windscreen 113, namely, the windscreen 113 is made to have a function of opening/closing the air introduction port 2. For example, at a time of traveling at high speed, the windscreen 113 is raised, so that the air introduction part 1 becomes in the opened state as illustrated in FIG. 5A, resulting in that a part of the traveling air 10 taken in from the air introduction part 1 passes through the internal ventilation passage 12 and the internal ventilation passage 13 to be exhausted from the air-exhaust port 4 of the air-exhaust part 3 or the air-exhaust port 6 of the air-exhaust part 5.

As described above, by making the traveling air 10 to be taken in from the air introduction part 1 and exhausted from the air-exhaust ports 4 and 6, it is possible to alleviate the generation of the negative pressure region S in front of the passenger M or to cool the measuring instruments of the meter main body part 115. When it is required to take in the traveling air 10 for the purpose of alleviating the negative pressure, cooling the instrument or the like, as described above, the air introduction port 2 is opened to actively make an air from the front direction of the vehicle to be easily taken in. On the other hand, when there is no necessity of taking in the traveling air 10 at a time of traveling at low speed and the like, the windscreen 113 is lowered to substantially close the air introduction part 1, and at this time, operation and effect such that an air resistance is reduced and the like, are simultaneously exhibited.

Further, the windscreen 113 vertically moved by the varying mechanism 128 covers a larger area of the air introduction part 1 at its lower end position, compared to a case in which the windscreen 113 is positioned at its rising end position.

Specifically, although the overlap area between the air introduction part 1 and the windscreen 113 is reduced in front elevational view of the vehicle as illustrated in FIG. 5A when the windscreen 113 is raised, the overlap area between the both is increased as illustrated in FIG. 6A when the windscreen 113 is lowered.

Generally, at a time of traveling at high speed in which the windscreen 113 is often raised, a strong negative pressure is generated at a rear of the front panel 118 and the windscreen 113, so that an effect of alleviating the negative pressure achieved by leading the traveling air is large. Under this situation, by disposing the air introduction part 1 so that the part is exposed from the lower edge of the windscreen 113 in front elevational view of the vehicle, the air from the front direction of the vehicle is made to be easily taken in. Further, since a larger amount of air can be sent to the rear of the front panel 118 and the windscreen 113, the negative pressure state can be effectively alleviated, resulting in that the comfortability is improved. Conversely, at a time of traveling at low speed in which the windscreen 113 is often lowered, there is created a state where the negative pressure itself to be generated is weak, and it is not required to take in the traveling air, and by covering, at this time, the air introduction part 1 with the windscreen 113, an excessive air introduction with respect to the passenger M is suppressed, resulting in that the comfortability is improved.

Further, in front elevational view of the vehicle, the windscreen 113 covers the entire area of the air introduction part 1 at its lower end position. Specifically, when the windscreen 113 is lowered, the windscreen 113 completely covers the air introduction part 1 in front elevational view of the vehicle as illustrated in FIG. 6A.

Under the situation where no air introduction is needed, an unnecessary blow of air with respect to the passenger M is stopped, and accordingly, the comfortability of the passenger M is improved. In this case, by disposing the air introduction part 1 so that it is housed within a movable range of the windscreen 113 (this range corresponds to a region in which another part such as the head lamps 126 cannot be disposed), at a position right behind the windscreen 113, when the windscreen 113 is lowered, it is possible to completely hide the air introduction part 1 as illustrated in FIG. 6A, resulting in that an excellent external appearance can be achieved. Further, the degree of freedom of disposition and design of another part, which is, for example, the head lamps 126 or the like, positioned at the front surface of the front cowling 112, is improved.

Further, the windscreen 113 includes the approximately transparent screen main body 113A and the non-transparent cover 113B that covers the lower part of the screen main body 113A. In this case, the cover 113B covers the approximately entire area of the air introduction part 1 at the lower end position of the windscreen 113, in front elevational view of the vehicle.

By providing the air introduction part 1 at the position hid by the non-transparent cover 113B as illustrated in FIG. 6A, when the vehicle is stopped and the windscreen 113 is lowered, it is possible to hide the air introduction part 1 positioned at the front surface of the vehicle body. When it is designed such that the periphery of the air introduction part 1 cannot be seen as described above, it is possible simplify the external appearance, to thereby improve the appearance.

Further, the screen backside ventilation passage 11 is provided on the backside of the windscreen 113. The screen backside ventilation passage 11 is formed from the lower part of the windscreen 113 to the rearward and upward directions along the front surface of the front meter panel 116, in the space between the rear surface of the windscreen 113 and the front meter panel 116. The air introduction part 1 is positioned at the front surface of the front meter panel 116 and is communicated with the intermediate portion of the screen backside ventilation passage 11, and the cross-sectional area of the screen backside ventilation passage 11 is reduced as the windscreen 113 is moved upward.

Namely, the movable windscreen 113 whose aspect can be changed in accordance with the situation and the like of the vehicle, is made to have a function of narrowing the screen backside ventilation passage 11. When the traveling air is required to be taken in for alleviating the negative pressure, since the negative pressure is generated in a wide range when the windscreen 113 is raised, in particular, by narrowing the cross-sectional area of the screen backside ventilation passage 11 at this time, a larger amount of air taken in from the front surface of the front cowling 112 can be led to the air introduction part 1, and the air can be led not only to the rear of the windscreen 113 but also to the rear of the front meter panel 116 or the rear of the front panel 118, namely, the part right in front of the passenger M, resulting in that the negative pressure can be efficiently alleviated in a wider range even with the small number of air introduction port 2, which improves the comfortability.

As described above, in the windshield device of the present invention, at a time of traveling at normal speed including relatively low speed, basically, the traveling air 10 is not taken in from the air introduction part 1, to thereby suppress the unnecessary entrainment of wind and the like, and on the other hand, when the traveling air 10 is required to be taken in at a time of traveling at high speed or cooling the instruments and the like, in particular, the air introduction port 2 is opened so that the traveling air 10 is actively made to be easily taken in. As described above, the traveling air 10 is not simply taken in from the air introduction part 1, but, the traveling air 10 can be effectively taken in according to the state and the like of the vehicle. At this time, it is possible to improve the degree of freedom of design of another part and the like in the periphery of the device, and to substantially guarantee the appearance of the vehicle.

Figure 11:
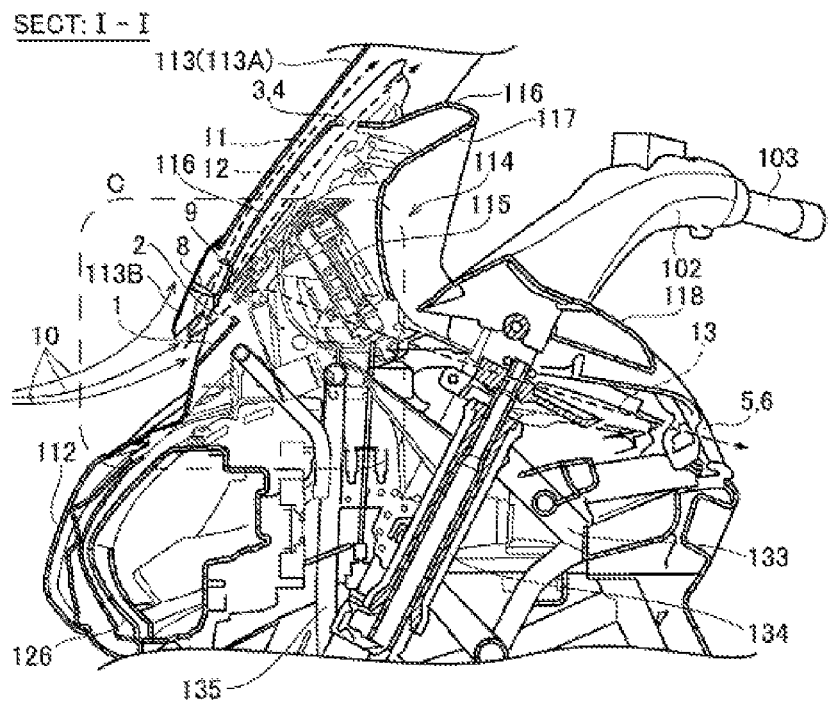
FIG. 11 shows a sectional view taken along line I-I in FIG. 5A and an enlarged view of a part C, illustrating a second embodiment of the present invention.
Figure 11:
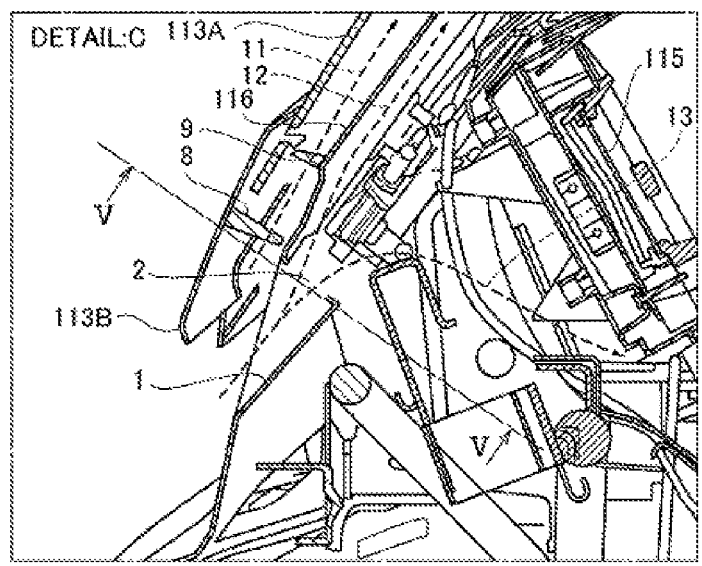
Figure 12:
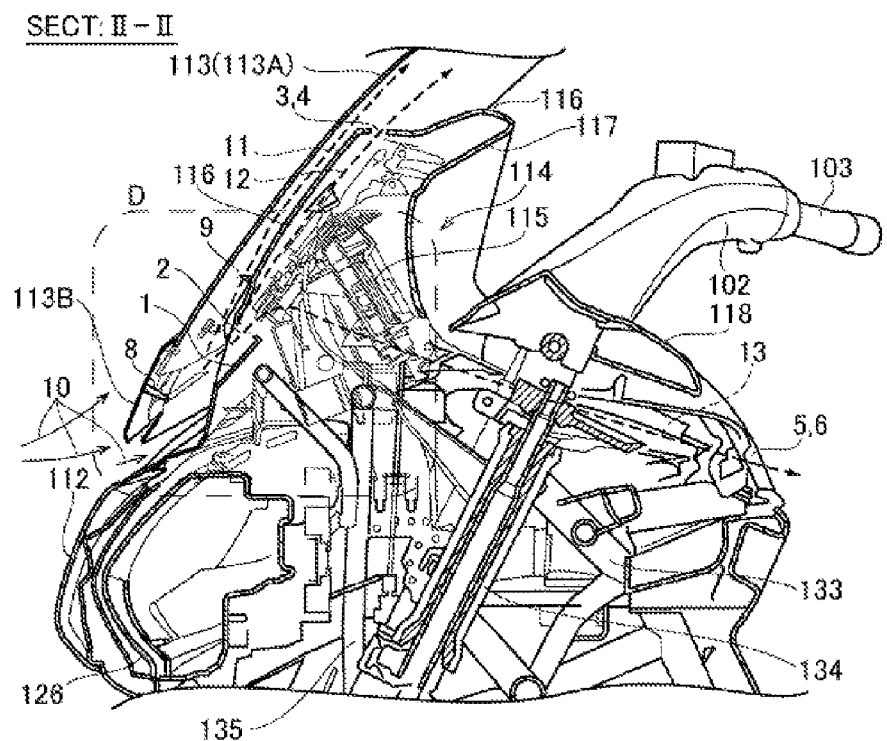
FIG. 12 shows a sectional view taken along line II-II in FIG. 6A and an enlarged view of a part D, illustrating the second embodiment of the present invention.
Figure 12:
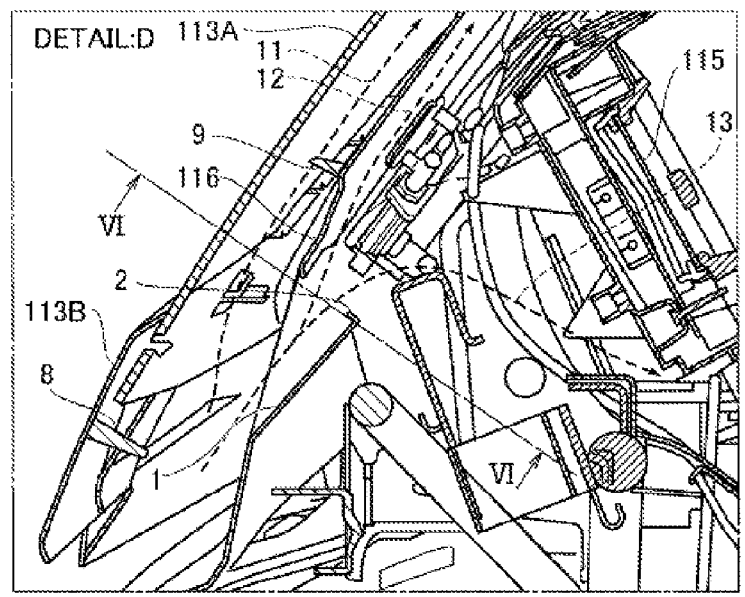

Here, a second embodiment of the windshield device for the vehicle of the present invention will be described. Note that the same reference numerals are given to members which are substantially the same as those of the above-described embodiment or members corresponding to those of the above-described embodiment. FIG. 11 and FIG. 12 illustrate an internal structure of a vehicle body cover at a front part of a vehicle in the second embodiment. Note that FIG. 11 illustrates a state where the windscreen 113 is raised, and further, FIG. 12 illustrates a state where the windscreen 113 is lowered.

Figure 13:
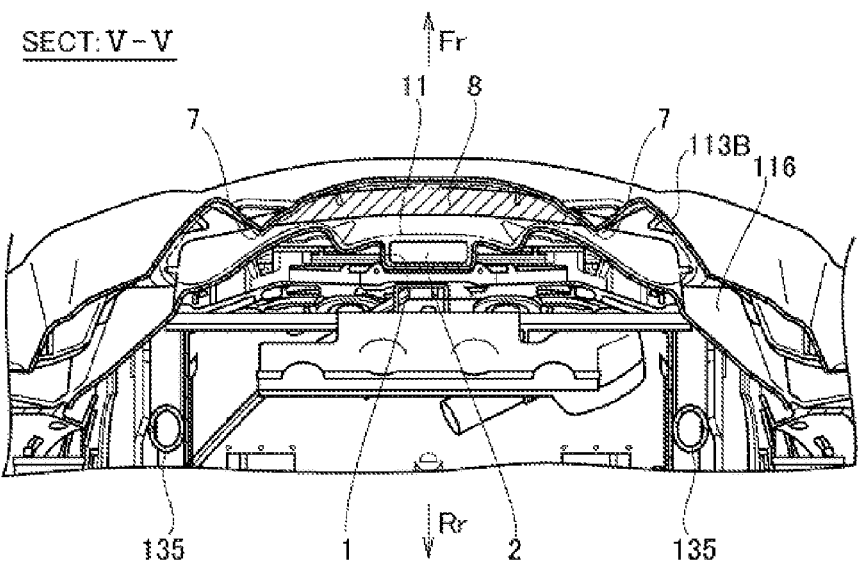
FIG. 13 is a sectional view taken along line V-V in FIG. 11, illustrating a part in the periphery of a screen backside ventilation passage when a windscreen in the second embodiment of the present invention is raised.
Figure 14:
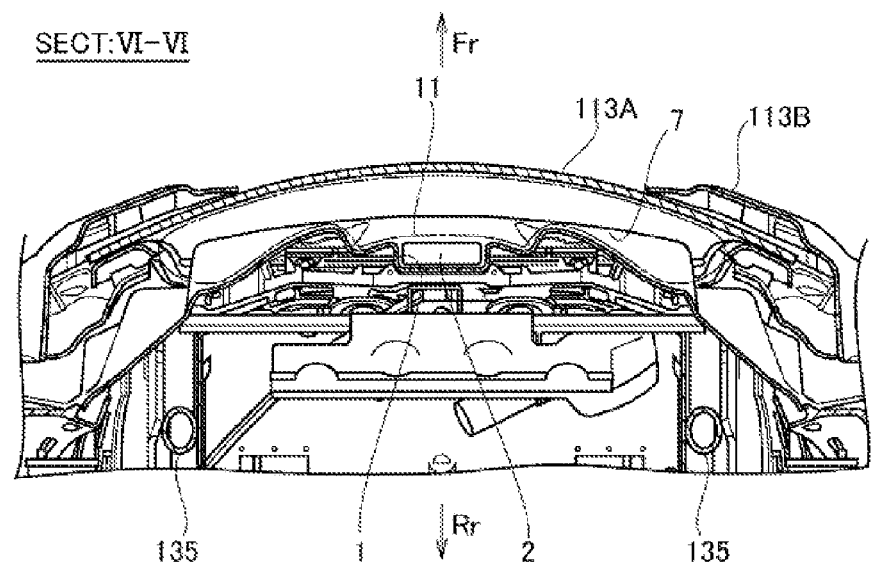
FIG. 14 is a sectional view taken along line VI-VI in FIG. 12, illustrating a part in the periphery of the screen backside ventilation passage when the windscreen in the second embodiment of the present invention is lowered.

In the second embodiment, in particular, the windscreen 113 is provided with a projecting piece 8 which can block the screen backside ventilation passage 11 or reduce a cross-sectional area of passage of the screen backside ventilation passage 11 at a position above the air introduction port 2 when the windscreen 113 is raised, as illustrated in FIG. 11. The projecting piece 8 is formed of a flexible member, so that it has flexibility, and as illustrated in FIG. 11, in this example, the projecting piece 8 is formed by being projected rearward on the backside of the cover 113B. Further, the projecting piece 8 is formed to have a considerable width in the horizontal direction with respect to the screen backside ventilation passage 11, as illustrated in FIG. 13 in which a forming region of the projecting piece 8 is indicated by oblique lines.

Meanwhile, the front meter panel 116 is provided with a projecting piece 9 which can block the screen backside ventilation passage 11 or reduce a cross-sectional area of passage of the screen backside ventilation passage 11 at a position above the air introduction port 2, as illustrated in FIG. 11 or FIG. 12. The projecting piece 9 has flexibility, and as illustrated in FIG. 11 and the like, the projecting piece 9 is formed by being projected forward on the front surface side (front side) of the front meter panel 116. The projecting piece 9 is also formed to have a considerable width in the horizontal direction with respect to the screen backside ventilation passage 11.

As described above, in the second embodiment of the present invention, the windscreen 113 is provided with the projecting piece 8 which can block the screen backside ventilation passage 11 or reduce the cross-sectional area of the screen backside ventilation passage 11 at the position above the air introduction part 1, as illustrated in FIG. 11.

The projecting piece 8 serves as a so-called weir with respect to the traveling air 10 to be flowed into the screen backside ventilation passage 11, resulting in that an effect of leading the air to the air introduction part 1 can be improved when the windscreen 113 is raised. When the windscreen 113 is raised, the air introduction part 1 is made to be in the opened state, which makes it possible to easily take in the traveling air 10 from the air introduction part 1, and together with the above effect, it is possible to more effectively facilitate the effect of making the traveling air 10 flow into the air introduction part 1 while suppressing the flow of traveling air 10 into the screen backside ventilation passage 11. Namely, the traveling air 10 can be more efficiently taken in from the air introduction part 1.

Further, the projecting piece 8 is provided on the rear surface of the cover 113B of the windscreen 113.

It is designed such that by providing the projecting piece 8 at a position hid by the cover 113B being the non-transparent member, the projecting piece 8 does not appear in the external appearance, and from this point as well, the improvement in appearance can be realized.

Further, the front meter panel 116 is provided with the projecting piece 9 which can block the screen backside ventilation passage 11 or reduce the cross-sectional area of the screen backside ventilation passage 11 at the position above the air introduction part 1.

The projecting piece 9 serves as a weir with respect to the air to be flowed into the screen backside ventilation passage 11, and also in this case, it is possible to improve the effect of leading the air to the air introduction part 1 in a state where the windscreen 113 is raised.

Further, the projecting piece 8 or the projecting piece 9 is formed of the flexible member.

When the projecting piece 8 or the projecting piece 9 is formed as a member which is abutted on an abutting surface with the front meter panel 116 or the windscreen 113 and is bent, a gap at the abutting surface is reduced as much as possible, resulting in that the air that flows into the screen backside ventilation passage 11 can be more effectively blocked.

The present invention has been described above together with the various embodiments, but, the present invention is not limited only to these embodiments, and modifications and the like can be made within the scope of the present invention.

For example, it is also possible to provide a plurality of air introduction parts 1 (or air introduction ports 2) and air-exhaust parts 3, 5 (or air-exhaust ports 4, 6) along the horizontal direction (vehicle width direction) with a predetermined interval therebetween, in a manner other than the above.

Further, although the present embodiment is configured such that the air introduction port 2 is provided on the front meter panel 116, it is not limited to use the meter panel as long as a member positioned behind the windscreen 113 and provided with the air introduction port 2 is employed. For example, even if a member formed by extending the front cowling 112 in the upper direction or another cover member is employed, a similar effect can be expected, and accordingly, this case can be regarded as the same as the present case.

Further, as a target applicable to the present invention, it is also possible to employ a small-sized vehicle including a cowling structure similar to that of the present embodiment (a four-wheel off-road vehicle or the like, for example), other than the motorcycle.

According to the present invention, by changing a substantial opening area of an air introduction port positioned at a rear of a windscreen, namely, by providing a function of opening/closing an air introduction part in accordance with a state of the movable windscreen, it is possible to effectively and properly adjust an amount of air to be introduced.

Further, according to the present invention, when the windscreen is raised, a screen backside ventilation passage is narrowed to reduce a cross-sectional area of the passage, to thereby adjust an amount of air to be introduced toward the backside of the windscreen, resulting in that a traveling air can be more efficiently led to another air introduction path.

It should be noted that the above embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A windshield device for a vehicle, comprising:

a vehicle body cover formed by a front cowling covering, from a front direction, a front-head part of a vehicle body, meter panels positioned at a rear of the front cowling, and a front panel positioned behind and below the meter panels, such that the front cowling, meter panels, and front panel are mutually coupled, said vehicle body cover covering the front-head part of the vehicle body to form a uniform external appearance of the front part of the vehicle body; and a windscreen disposed at a position above the front cowling and capable of being vertically moved by a varying mechanism between a lower end position and a rising end position, wherein:

a traveling air taken in at a front part of said vehicle body cover via an air introduction part is exhausted from air-exhaust parts at proper places on the meter panels or the front panel;

an overlap area between said windscreen and the air introduction part in front elevational view of the vehicle changes in accordance with an aspect of said windscreens;

a screen backside ventilation passage is provided at a backside of said windscreen, and the air introduction part is positioned at a front surface of the meter panels and is communicated with an intermediate portion of the screen backside ventilation passage, and a cross-sectional area of the screen backside ventilation passage is reduced as said windscreen moves upward.

2. The windshield device for the vehicle according to claim 1, wherein:

the varying mechanism can change the aspect of said windscreen including at least a position, an angle and a shape; and said windscreen covers a larger area of the air introduction part at the lower end position, compared to a case in which said windscreen is positioned at the rising end position, in front elevational view of the vehicle.

3. The windshield device for the vehicle according to claim 2, wherein:

said windscreen covers, at the lower end position an entire area of the air introduction part in front elevational view of the vehicle.

4. The windshield device for the vehicle according to claim 3, wherein:

said windscreen comprises an approximately transparent screen main body and a non-transparent cover covering a lower part of the screen main body, wherein the non-transparent cover covers an approximately entire area of the air introduction part at the lower end position of said windscreen, in front elevational view of the vehicle.

5. The windshield device for the vehicle according to claim 1, wherein:

the screen backside ventilation passage is formed rearward and upward from a lower part of said windscreen along the front surface of the meter panels, in a space between a rear surface of said windscreen and the meter panels.

6. The windshield device for the vehicle according to claim 1, wherein:

said windscreen comprises a projecting piece capable of blocking the screen backside ventilation passage or reducing the cross-sectional area of the screen backside ventilation passage, at a position above the air introduction part.

7. The windshield device for the vehicle according to claim 6, wherein:

the projecting piece is provided at a rear surface of a cover of said windscreen.

8. The windshield device for the vehicle according to claim 1, wherein:

the meter panels comprises a projecting piece capable of blocking the screen backside ventilation passage or reducing the cross-sectional area of the screen backside ventilation passage, at a position above the air introduction part.

9. The windshield device for the vehicle according to claim 6, wherein: the projecting piece is formed of a flexible member.

10. The windshield device for the vehicle according to claim 8, wherein: the projecting piece is formed of a flexible member.

* * * * *